April 29, 1930.  R. A. FULLER  1,756,903
AUTOMATIC SWITCHING SYSTEM
Filed Aug. 29, 1928
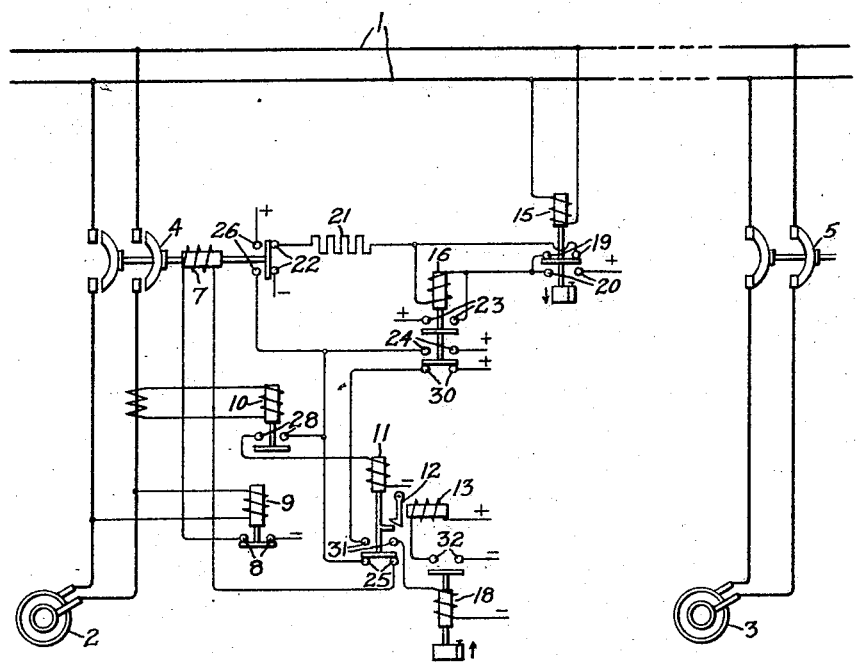
Inventor:
Roger A. Fuller,
by Charles V. Tullar
His Attorney.

Patented Apr. 29, 1930

1,756,903

UNITED STATES PATENT OFFICE

ROGER A. FULLER, OF PHILADELPHIA, PENNSYLVANIA, ASSIGNOR TO GENERAL ELECTRIC COMPANY, A CORPORATION OF NEW YORK

AUTOMATIC SWITCHING SYSTEM

Application filed August 29, 1928. Serial No. 302,841.

My invention relates to automatic switching systems and particularly to systems for controlling the connections between a plurality of sources of current and a load circuit so that when a source, which is supplying current to the load circuit, fails or is disconnected therefrom by an overload thereon, another source is automatically connected to the load circuit to restore the supply of current thereto. One object of my invention is to provide an improved arrangement of apparatus for controlling the connection between a source of current and a load circuit in such a system.

In such systems it has been customary to provide an arrangement whereby another source is immediately connected to the load circuit in case the voltage of the source supplying current to the load circuit fails, and whereby the plurality of sources are successively connected to the load circuit a plurality of times and are finally locked out against further connections to the load circuit when a permanent fault occurs thereon. After being locked out it has been necessary for an operator to reset certain devices before the automatic devices are operative again. In accordance with my invention I provide an arrangement whereby a fault on the load circuit causes one of the sources to be connected to the load circuit a plurality of times with predetermined time intervals between successive connections before being locked out and the other source is locked out whenever it is disconnected from the load circuit due to an overload therein and whereby the lockout means associated with the latter source is arranged to be rendered inoperative whenever the load circuit voltage is subsequently restored to normal for a predetermined time. By means of my invention the duty of one of the switches connecting the sources to the load circuit is materially reduced without materially affecting the continuity of service to the load circuit and furthermore the automatic operation of both control arrangements may be restored, after both have been locked out, merely by an operator reconnecting one of the sources to the load circuit.

My invention will be better understood from the following description taken in connection with the accompanying drawing and its scope will be pointed out in the appended claims.

Referring to the drawing which is a diagram of a system of distribution embodying my invention, 1 represents a load circuit such as a section of a railway signalling system which is arranged to be supplied with current at different points by two suitable sources of current 2 and 3. The sources 2 and 3 are arranged to be connected to the load circuit 1 by means of the switches 4 and 5 respectively which may be of any suitable type examples of which are well known in the art.

The switch 5 is provided with any suitable control arrangement, examples of which are well known in the art, whereby it is immediately closed whenever the voltage across the load circuit 1 decreases below a predetermined value while the voltage of the source 3 is normal and the switch 5 is open and also whereby it is closed and opened a plurality of times with predetermined time intervals between successive reclosures after which it is locked out against further reclosures when there is a permanent fault connected to the load circuit. In the copending application Serial No. 293,629, filed July 18, 1928, by A. E. Anderson, and assigned to the assignee of this application there is disclosed a control arrangement which may be used to control the operation of the switch 5.

For controlling the opening and closing of the switch 4 I provide a control arrangement for effecting the opening of the switch 4 when the associated source 2 fails, or is overloaded, and the closing of the switch 4 when it is open, the associated source 2 is energized and the load circuit voltage is below a predetermined value. I also provide means for preventing the switch 4 from being reclosed after it has been opened by an overload until the load circuit voltage has been restored to normal for a predetermined time.

In the particular arrangement shown in the drawing the switch 4 is of the well known contactor type having a closing coil 7 which when energized closes and maintains the switch closed. The circuit of the closing coil 7 includes contacts 8 of a voltage relay 9 which is responsive to the voltage of source 2 so that the closing coil 7 can be energized only when the voltage of the source 2 is above a predetermined value. In order to effect the opening of the switch 4 when it is closed and an overload occurs on the load circuit 1, any suitable overload responsive means, examples of which are well known in the art, may be provided for effecting the de-energization of the coil 7. As shown I accomplish this result by means of an overload relay 10 which is connected so as to be responsive to the current output of the source 2 and which is arranged to effect the energization of an associated control relay 11 when the current output of the source 2 exceeds a predetermined value. The control relay, when energized, opens contacts in the circuit of the closing coil 7 so that the switch 4 is opened. The control relay 11 is of the type well known in the art as a lockout relay and is held in its energized position by a latch 12 until a release coil 13 associated therewith is energized. Therefore after the control relay 11 has been energized in response to an overload on the source 2 the switch 4 is prevented from closing again until the release coil 13 is energized.

For effecting the closing of the switch 4 when it is open and the load circuit voltage fails, due to a failure of the source 3 I provide a voltage relay 15 which is connected across the load circuit 1 and an associated control relay 16. The voltage relay 15 and its associated control relay 16 are arranged to effect the closing of contacts in the energizing circuit of the closing coil 7 when the voltage of the circuit 1 is below a predetermined value.

In order to effect the energization of the release coil 13 of the lockout relay 11 so as to restore the lockout relay 11 to its normal position when the voltage of the load circuit 1 is above a predetermined value for a predetermined time after the lockout relay has been operated, the voltage relay 15 and its associated relay 16 are arranged to effect the energization of a suitable time relay 18 when the load circuit voltage is above a predetermined value. The time relay 18, when energized a predetermined time, is arranged to effect the energization of the release coil 13.

The operation of the arrangement shown in the drawing is as follows: When the switch 5 is closed so that the source 3 is supplying current to the load circuit 1, the switch 4 is open and the control apparatus associated therewith is in the position shown in the drawing. When the voltage of the source 3 fails, while it is supplying current to the load circuit, the automatic control apparatus associated with the switch 5 effects the opening thereof in a manner well known in the art and prevents a subsequent closure thereof as long as the voltage of the source 3 is below a predetermined value. When the voltage of the load circuit 1 decreases below a predetermined value due to the failure of the source 3, the voltage relay 15 associated with the switch 4, after a short time delay, opens its contacts 19 which complete a short circuit around the coil of the control relay 16 and closes its contacts 20 which are in an energizing circuit for the coil of the control relay 16. The circuit of the relay 16 is from one side of a suitable source of control current through contacts 20 of relay 15, coil of relay 16, resistor 21, auxiliary contacts 22 on switch 4 to the other side of the control circuit. The relay 16 by closing its contacts 23 completes a locking circuit for itself which is independent of the contacts 20. The relay 16 by closing its contacts 24 completes a circuit for the closing coil 7 to close the switch 4 and connect the source 2 to the load circuit 1. This circuit is from one side of the control circuit through contacts 24 of relay 16, contacts 25 of lockout relay 11, closing coil 7, contacts 8 of relay 9 to the other side of the control circuit. The switch 4 by closing its auxiliary contacts 26 completes a locking circuit for the closing coil 7 so that the switch 4 remains closed after the control relay 16 subsequently opens its contacts 24 due to the voltage of the load circuit being restored to normal and the voltage relay 15 opening its contacts 20 and closing its contacts 19. The source 2 remains connected to the load circuit until either the source 2 fails or an overload occurs on the load circuit so that the overload relay 10 closes its contacts 28. The closing of the contacts 28 in response to an overload on the load circuit completes through the auxiliary contacts 26 on the switch 4 a circuit for the operating coil of the lockout relay 11. The lockout relay 11, when in its energized or lockout position, maintains open the contacts 25 in the circuit of the closing coil 7. Therefore, after the switch 4 has been opened by an overload, the closing coil 7 is prevented from being energized by the relay 16 closing its contacts 24.

When the voltage across the load circuit 1 decreases below a predetermined value due to an overload on the load circuit effecting the opening of the switch 4, the automatic control arrangement (not shown) associated with the switch 5 functions in a manner well known in the art to reclose the switch 5 a predetermined number of times and for locking it out against further closures if the fault is of a permanent character. Therefore when an overload of a permanent character occurs on the load circuit 1 the switch 5 is reclosed a plurality of times whereas further reclosing of the switch 4 is prevented after the first opening of the switch 4 in response to an overload. Consequently the duty on the switch 4 is materially reduced as well as the amount of control apparatus associated therewith for the controlling of the operation thereof.

In case the fault is removed before the switch 5 is locked out so that it remains closed after one of its automatic reclosures or the switch 5 is closed again after it has been locked out and the fault subsequently removed, the restoration of normal voltage across the load circuit effects the deenergization of the control relay 16 which in turn effects the energization of the time relay 18. The circuit of the time relay includes the contacts 30 of the control relay 16 and the contacts 31 of the lockout relay 11. After the voltage across the load circuit has remained at its normal value for a predetermined time, time relay 18 closes its contacts 32 and thereby completes a circuit for the release coil 13 to restore the lockout relay to its normal position so that the control arrangement associated with the switch 4 is again operative to effect the connection of the source 2 to the load circuit 1 when the voltage thereof subsequently fails.

While I have in accordance with the patent statutes shown and described my invention as applied to a particular system and as embodying various devices diagrammatically indicated, changes and modifications will be obvious to those skilled in the art, and I, therefore aim in the appended claims to cover all such changes and modifications as fall within the true spirit and scope of my invention.

What I claim as new and desire to secure by Letters Patent of the United States, is:

1. In combination, a load circuit, a source of current, a switch for connecting said source to said load circuit, means controlled by the voltage of said circuit for effecting the closing of said switch when the load circuit voltage decreases below a predetermined value, means controlled by the current output of said source for opening said switch and for preventing said voltage controlled means from effecting the closing of said switch when the load circuit voltage decreases below said predetermined value due to the opening of said switch being effected by said current output controlled means, and means controlled by the voltage of said load circuit for restoring the control of the closing of the switch to said voltage controlled means whenever the load circuit voltage remains above a predetermined value for a predetermined time after the operation of said current output controlled means.

2. In combination, a load circuit, a source of current, a switch for connecting said source to said load circuit, means controlled by the voltage of said circuit for effecting the closing of said switch when the load circuit voltage decreases below a predetermined value, overload responsive means for effecting the opening of said switch, a lockout relay controlled by said overload responsive means for preventing said voltage controlled means from effecting a subsequent closing of said switch whenever said switch is opened in response to the operation of said overload responsive means, and means controlled by the load circuit voltage for controlling said lockout means to restore the control of the closing of said switch to said voltage controlled means whenever the load circuit voltage remains above a predetermined value for a predetermined time after the operation of said overload responsive means.

3. In combination, a load circuit, a source of current, a switch for connecting said source to said circuit, means for closing said switch including an electroresponsive device, an energizing circuit for said device, contacts in said energizing circuit, means controlled by the voltage of said load circuit for controlling certain of said contacts, a lockout relay controlled by the current output of said source for controlling other contacts in said energizing circuit, means for maintaining said lockout relay in its lockout position, and timing means controlled by the voltage of said load circuit for resetting said lockout relay whenever the load circuit voltage remains above a predetermined value for a predetermined time while said lockout relay is in its lockout position.

4. In combination, a load circuit, a source of current, means for connecting said source to said circuit, a second source of current, a switch for connecting said second source to said circuit, means responsive to the voltage of said circuit for effecting the closing of said switch when the load circuit voltage decreases below a predetermined value, means responsive to a predetermined abnormal condition of said second source for effecting the opening of said switch, and means controlled by said abnormal condition responsive means for rendering said voltage responsive means inoperative to reclose said switch after any opening thereof due to the operation of said overload responsive means until the voltage of said load circuit has been restored to a predetermined value for a predetermined time.

5. In combination, a load circuit, a source of current, means for connecting said source to said circuit, a second source of current, a switch for connecting said second source to said circuit, control means responsive to a predetermined condition of said circuit for effecting the closing of said switch when said predetermined condition occurs while said first mentioned source is supplying current to said load circuit, means responsive to the current output of said second source for opening said switch when the current output of said second source exceeds a predetermined value, means controlled by said current output responsive means for rendering said control means inoperative to reclose said switch after any opening thereof due to the operation of said current output responsive means, and timing means controlled by a predetermined condition of said circuit for restoring the control of said switch to said control means after said last mentioned predetermined condition of said load circuit has existed for a predetermined time.

In witness whereof, I have hereunto set my hand this twenty-seventh day of August, 1928.

ROGER A. FULLER.